United States Patent [19]
Vesco et al.

[11] Patent Number: 5,377,420
[45] Date of Patent: Jan. 3, 1995

[54] FEELER DEVICE, PARTICULARLY FOR COPYING MACHINES

[75] Inventors: Mario Vesco; Giancarlo Zaramella, both of Turin, Italy

[73] Assignee: Fidia S.p.A., San Mauro Torinese, Italy

[21] Appl. No.: 171,667

[22] Filed: Dec. 22, 1993

[30] Foreign Application Priority Data

Dec. 24, 1992 [IT] Italy .................... TO92A01042

[51] Int. Cl.$^6$ .................... G01B 11/24; G01B 5/20
[52] U.S. Cl. .................................... 33/559; 33/556
[58] Field of Search ............ 33/559, 556, 558, 561

[56] References Cited

U.S. PATENT DOCUMENTS

| | | |
|---|---|---|
| 4,187,614 | 2/1980 | Abiru et al. |
| 4,473,955 | 10/1984 | McMurtry .................... 33/561 |
| 4,484,854 | 11/1984 | Chitayat .................... 414/730 |
| 5,209,131 | 5/1993 | Baxter .................... 33/559 |
| 5,326,982 | 7/1994 | Wiklund .................... 33/558 |

FOREIGN PATENT DOCUMENTS

| | | |
|---|---|---|
| 2345704 | 10/1977 | France. |
| 2642518 | 8/1990 | France. |
| WO9221932 | 12/1992 | WIPO. |

*Primary Examiner*—Christopher W. Fulton
*Attorney, Agent, or Firm*—Sughrue, Mion, Zinn, Macpeak & Seas

[57] ABSTRACT

A feeler device comprises a support structure in which a movable assembly is movably mounted along three axes, the movable assembly carrying at one end a feeler member. The movable assembly is suspended in the support structure by means of laminar elements which have respective slots of spiral, preferably logarithmic, form.

15 Claims, 5 Drawing Sheets

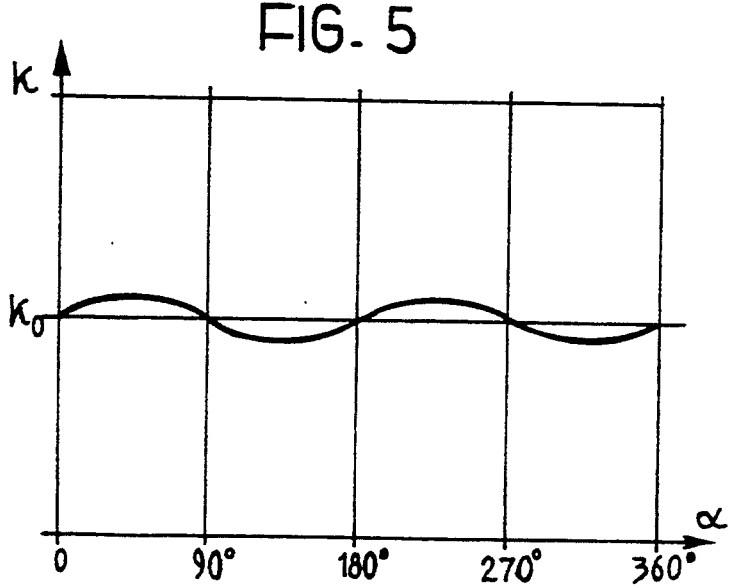
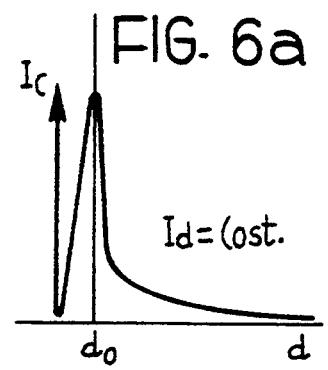
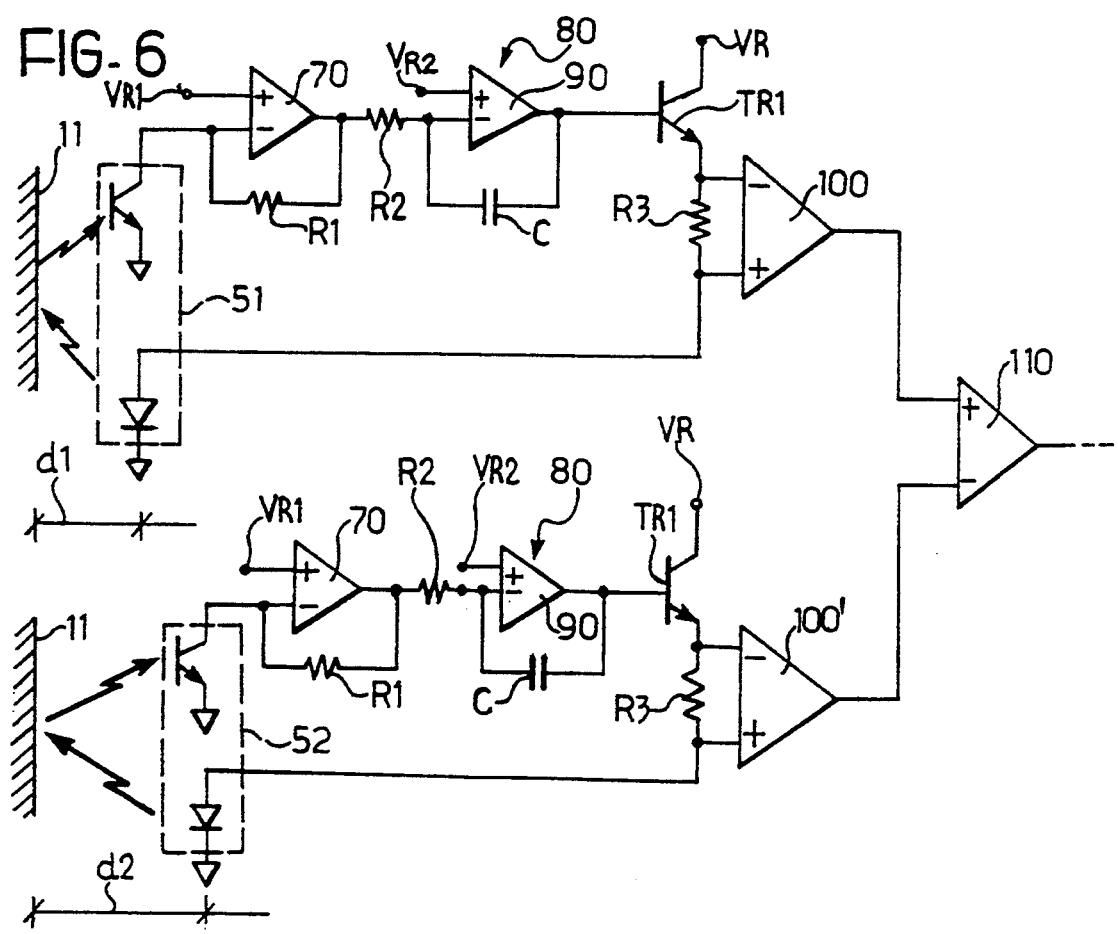

FEELER DEVICE, PARTICULARLY FOR COPYING MACHINES

BACKGROUND OF THE INVENTION

The present invention relates to a feeler device, particularly for copying machines, of the type comprising a support structure, a movable member of elongate form supported by the said structure by resilient suspension means operable to allow the movable member to perform limited displacements with respect to this structure along three independent axes with respect to a predetermined rest position; the said movable member carrying a feeler element at one end; and sensor means operable to provide electrical signals indicative of the magnitude and direction of the displacements along the said axes of the movable member with respect to the support structure.

SUMMARY OF THE INVENTION

The feeler device according to the invention is characterised by the fact that the said suspension means include at least first and second laminar members each of which has an aperture; a spiral slot being formed in the region between the outer and inner edge of each laminar member, which slot extends around the said aperture for an angle greater than 360°;

the said laminar members being interposed between the support structure and the feeler member in respective positions spaced along the axis of the feeler member; the peripheral portion and the portion surrounding the aperture of each laminar member being fixed one to the support structure and the other to the feeler member.

Further characteristics and advantages of the feeler device according to the invention will become apparent from the following detailed description provided purely by way of non-limitative example, with reference to the attached drawings.

BRIEF DESCRIPTION OF THE DRAWINGS

FIG. 5 is a graph which shows the variation of the radial elastic constant k of a laminar suspension member such as that shown in FIG. 4, as a function of the angle $\alpha$;

FIG. 6 is a diagram of a circuit for processing the signals provided by the electrical position sensors comprised in the feeler device;

FIG. 6a is a diagram which shows the variation of the current distance characteristic of position sensors usable in the feeler device according to the invention;

DETAILED DESCRIPTION OF THE DRAWINGS

Figure 1:
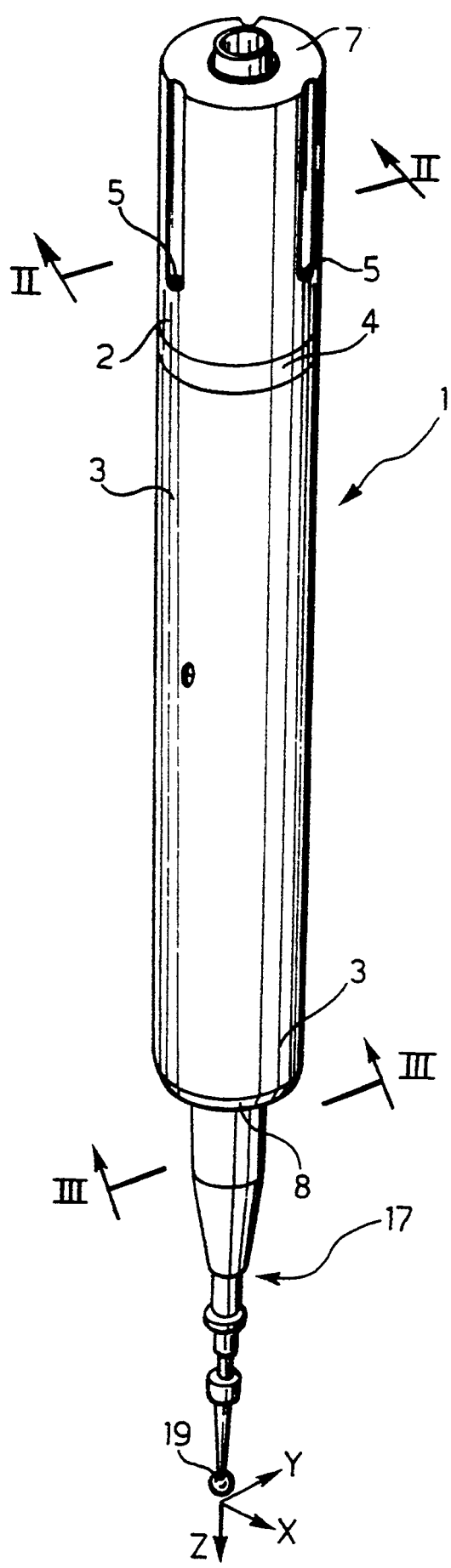
FIG. 1 is a perspective view of a feeler device according to the invention.
Figure 2:
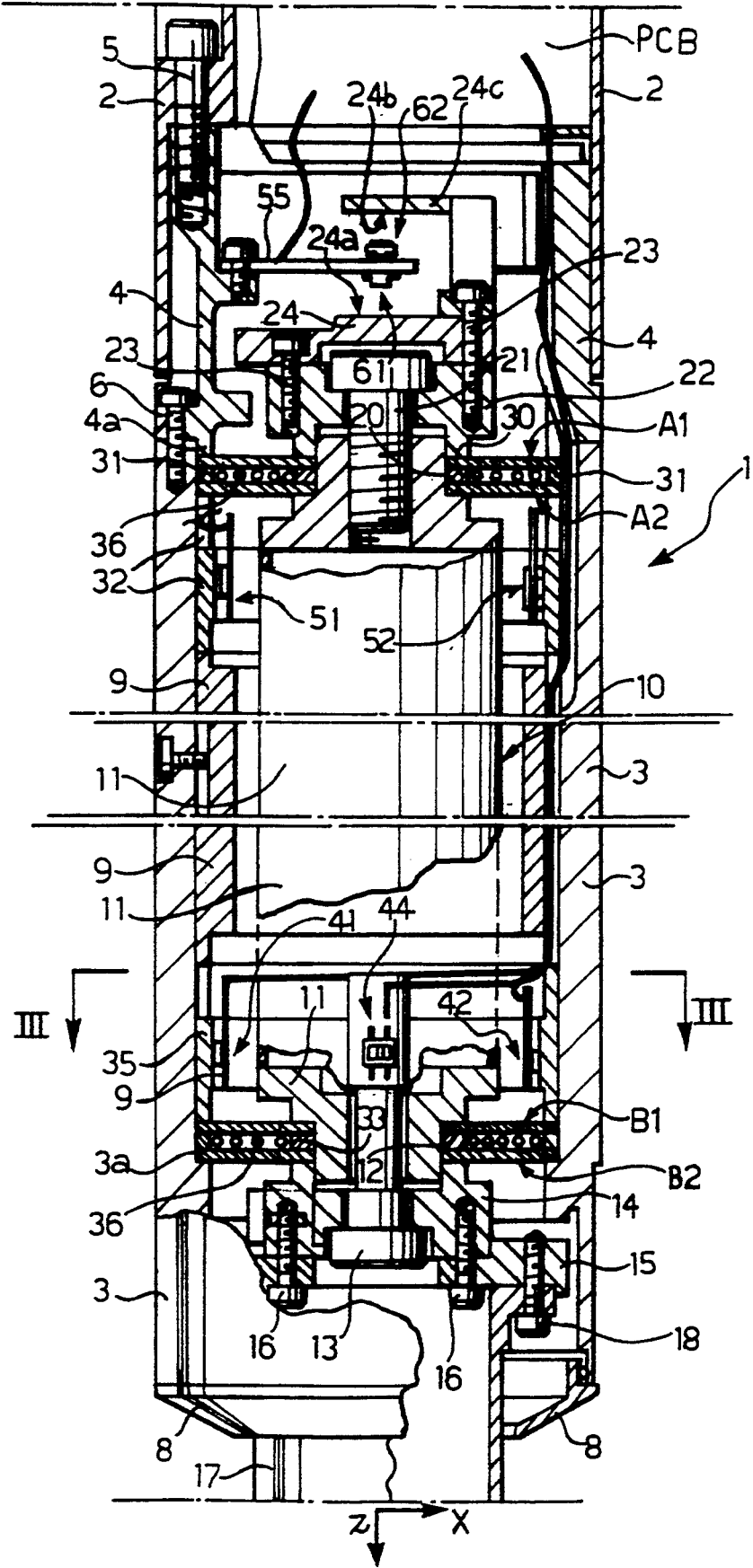
FIG. 2 is a partially sectioned view taken on the line II—II of FIG. 1.

With reference to FIGS. 1 and 2, in the exemplary embodiment illustrated the feeler device 1 comprises a support casing of substantially cylindrical form, comprising an upper inverted cup-shape element 2 connected to an underlying tubular element 3 by means of an annular interconnection element 4.

The cup-shape element 2 is fixed to the intermediate element 4 by means of screws indicated 5 in FIGS. 1 and 2. This intermediate element is in turn connected to the tubular element 3 by screws indicated 6 in FIG. 2.

In an aperture in the upper wall of the cup-shape element 2 is mounted a multipolar electrical connecter 7 (FIG. 1).

At the lower end of the tubular element 3 is coupled a frusto-conical annular element 8.

Within the tubular element 3 is fixed a further tubular element 9 (FIG. 2) of shorter length.

Within the above-described tubular support structure there is a movable assembly generally indicated 10 in FIG. 2. This movable member comprises a main body 11 which in the exemplary embodiment illustrated is a substantially hollow cylinder.

The lower end of this main body has a tapered section with a stepped profile which, in particular, forms an annular shoulder 12. This end has a threaded central aperture in which engages a screw 13 by means of which an annular element 14 is fixed to the said end of the main body. A further annular element 15 is connected to the element 14 by screws 16.

A feeler stem 17 is fixed to the annular element 15 by screws 18.

As is seen in particular in FIG. 1, the feeler stem 17 has a shaped profile which tapers progressively downwardly and terminates at the bottom end with a ball 19.

The feeler stem 17 extends, with wide clearance, into the central aperture of the conical end element 8 of the support casing of the feeler device.

The upper end of the main body 11 also has a tapered section with a stepped profile, and in particular forms a shoulder indicated 20. This end also has a threaded central aperture in which engages a screw 21 the head of which retains an annular element 22. A shaped member 24 is fixed to this element by screws 23; the function of this member will be described in more detail hereinbelow.

The movable member 10 is disposed coaxially and with wide radial clearance in the tubular casing described above, and is suspended from it resiliently, in a manner which will be described hereinbelow, such as to be able to perform, relative to this casing, limited displacements along three independent orthogonal axes indicated X, Y and Z in FIG. 1. The Z-axis coincides with the longitudinal axis of the feeler device.

In the exemplary embodiment illustrated the suspension of the movable member 10 in the support structure 2-9 is obtained by means of two pairs of laminar suspension members A1, A2; B1, B2, one of which can be seen in plan in FIG. 4.

Figure 4:
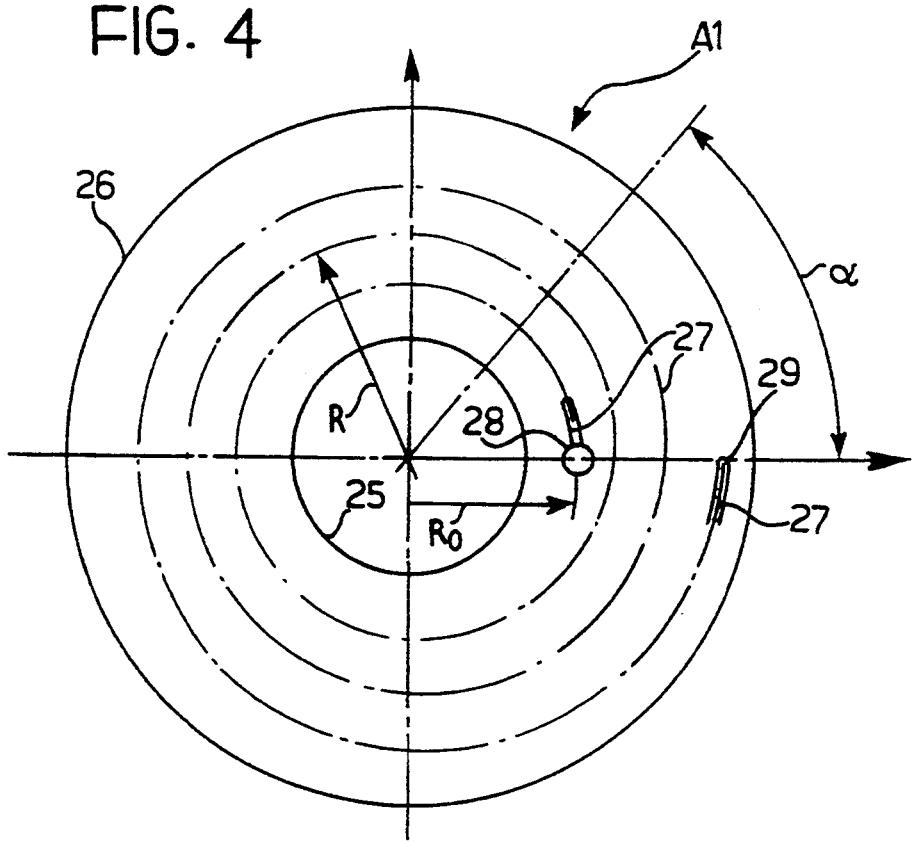
FIG. 4 is a plan view of a laminar suspension member comprised in the feeler device according to the invention.

These suspension members have a generally annular form, in particular a circular ring shape as is shown in FIG. 4. In this Figure the central aperture of the laminar suspension element is indicated 25.

In the region between the outer edge 26 and the aperture 25 of each laminar member is formed a spiral slot 27 preferably of logarithmic type.

The spiral slot 27 of each laminar suspension member extends around the central aperture 25 for an angle greater than 360°. In the embodiment illustrated in FIG. 4 the spiral slot 27 extends from an initial point 28 situated at a distance $R_o$ from the axis, and terminates at a point 29 after having performed three revolutions around the aperture 25. This slot therefore has an angular extent of 1080°.

As mentioned above, the spiral slot 27 preferably has a logarithmic spiral form of the equation $R=R_o e^{ma}$, in which R represents the distance of its general point from the axis, $R_o$ is the radius at the initial point of the spiral, and $a$ is the angle measured with respect to an axis which passes through the initial point of the spiral, as shown in FIG. 4.

The laminar suspension members A1, A2, B1 and B2 are conveniently made of ground tempered steel, and their spiral slot can be formed by edgewise spark-erosion.

The suspension members A1, A2 are disposed around the upper end of the main body 11 of the movable member 10, as shown in FIG. 2. The diameter of the aperture 25 of these suspension members is substantially equal to the outer diameter of the end of this main body.

The laminar suspension member A2 rests on the shoulder 20 of the upper end of the main body 11. This annular shoulder preferably has a radial extent less than the minimum distance between the spiral slot 27 and the central aperture 25 of this suspension member.

The outer peripheral portion of the suspension element A2 rests on an upper shoulder of an annual element 32 fixed to the tubular casing 3 above the inner tubular element 9. This shoulder preferably has a radial extent less than the minimum distance between the spiral slot 27 and the outer edge 26 of the suspension member.

Between the suspension members A1 and A2 are interposed respective inner and outer spacer washers 30 and 31 having the same thickness.

The assembly formed by the suspension members A1 and A2 and the washers interposed between them is locked at its periphery between the upper shoulder of the ring 32 and a lower edge 4a of the annular interconnection element 4. At the centre this assembly is locked between the annular shoulder 20 of the main body 11 of the movable member and the lower edge of the locking member 22. The outer edges 26 of the suspension members, A1, A2 are confined within the surrounding inner surface of the tubular element 3.

Similarly, the assembly of suspension members B1, B2 and the two washers 33, 34 interposed between them is disposed practically without internal play at the lower end of the main body 11 of the movable member 10, and is fixed centrally between the shoulder 12 and the top edge of the locking member 14. The periphery of this assembly is axially fixed between an inner shoulder 3a of the tubular element 3 and the lower edge of an annular element 35 fixed to the interior of this tubular element 3 beneath the tubular element 9.

Between the laminar suspension members A1, A2 and B1, B2 of each pair there is disposed a layer of small balls 36 having a diameter the same as or less than the distance between the said laminar members and greater than the width of their spiral slots 27. These balls are immersed in a viscous fluid in the annular space between the two suspension members and the associated spacer washers. On the opposite faces of the laminar elements of each pair is conveniently applied a film of material having a high viscosity, in particular, a grease of viscosity greater than that of the viscous fluid in which the balls 36 are immersed. This high viscosity material is, in particular, caused to enter into the spiral slot 27 of the laminar suspension members in such a way as to act as a barrier to obstruct or impede the escape of the said viscous fluid.

The balls 36 and the viscous fluid in which they are immersed exert, in operation, an effective oscillation damping action.

The particular configuration of the suspension members A1 to B2 described above is such as to allow the movable member 10 to perform limited displacements along the three independent axes X, Y and Z of FIG. 1 with respect to a rest position in which this movable member extends substantially coaxially with respect to the surrounding support structure.

In particular, the said suspension members allow a displacement of the movable member 10 in the X, Y plane by elastically deforming in the respective planes in which they lie. The displacement of the movable member 10 in a direction lying in the X, Y plane causes a reduction of the width of the spiral slot 27 in the direction of this displacement, and a widening of this slot in the opposite direction.

Calculations and tests performed by the inventors have in particular made it possible to ascertain that a suspension member of the type shown in FIG. 4 has a radial elastic constant k the variation of which as a function of the angle $a$ is qualitatively indicated in FIG. 5. In particular, it has been established that the radial elastic constant k has a substantially sinusoidal variation about an average value $k_o$, with a period of about 180° upon variation of the angle $a$. With an increase in the number of revolutions of the spiral slot about the central aperture of the suspension element the undulation of the radial elastic constant progressively reduces in width.

Independently of the number of revolutions of the spiral slot, in the embodiment illustrated in FIG. 2 the effects of (possible) undulation of the radial elastic constant can be substantially eliminated by disposing the suspension members A1, A2 (B1, B2) angularly offset by 90° or by 270° from one another. In this way the average radial elastic constant of the assembly formed by each pair of laminar suspension members is practically constant.

When the movable member 10 of the feeler device is subjected to a displacement along the Z-axis the laminar suspension members A1-B2 deform elastically out of the plane in which they lie at rest. For detection of the magnitude of the displacements of the movable member 10 with respect to the support casing use is made, for example, of the arrangement of sensors which will now be described.

Figure 3:
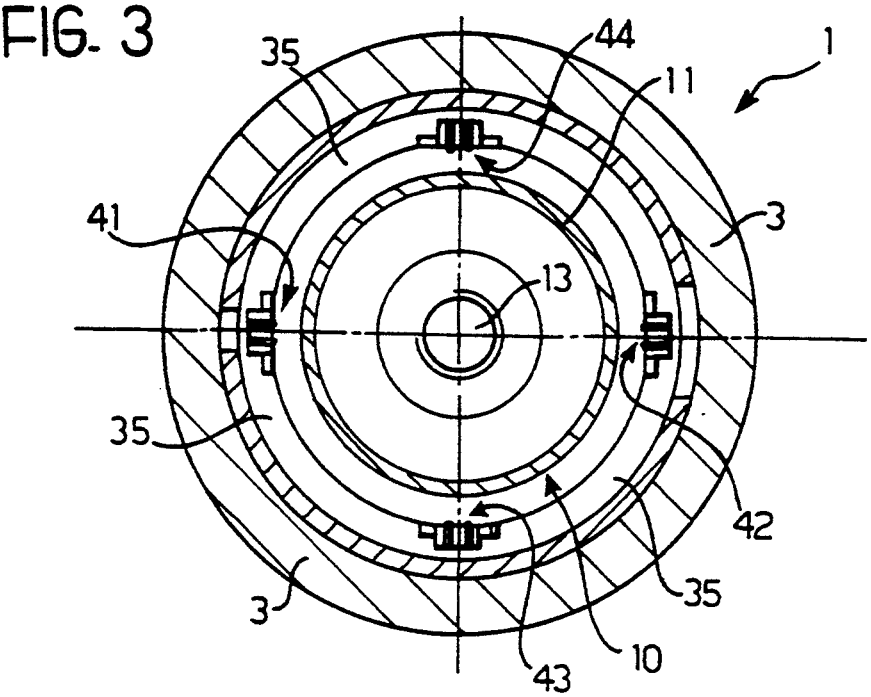
FIG. 3 is a sectional view taken on the line III—III of FIG. 2.

To detect displacements of the movable member along directions parallel to the X, Y plane the annular element 35 carries on its inner surface four angularly equally spaced sensors 41-44 (FIGS. 2 and 3), facing the outer surface of the main body 11 of the movable member 10. Each sensor includes a photodiode operable to direct a beam of radiation towards the main body 11, and an associated phototransistor operable to receive the radiation reflected or diffused by the body 11.

The arrangement of the pairs of sensors 41, 42 and 43, 44 is such that when the movable member 10 is displaced towards a sensor the radiation received by the phototransistor of this sensor increases, whilst correspondingly the radiation received by the phototransistor of the other sensor of the same pair decreases.

Similarly, four other angularly equally spaced sensors are fixed to the inner surface of the annular member 32 (FIG. 2), only two of which are visible in FIG. 2, in which they have been indicated with the reference 51 and 52.

To detect the magnitude and sign of the displacements of the movable member 10 along the Z-axis a projecting transverse bracket 55 (FIG. 2) is fixed internally to the annular interconnection element 4, which on two of its opposite faces carries two sensors 61, 62, likewise each comprising a light-emitting diode and an associated phototransistor.

The bracket 55 extends between an end surface 24a of the member 24, which extends transversely of the axis of the movable member 10, and a surface 24b of a projecting appendix 24c of the said member 24. The surface 24b is conveniently parallel to the surface 24a.

Preferably, even if not necessarily, the bracket 55 is disposed in such a way that the sensors 61 and 62 are spaced by the same distance from the facing surfaces 24a and 24b when the movable member 10 is in the rest position with respect to the surrounding support structure.

The arrangement of sensors 61 and 62 and the associated surfaces 24a and 24b is such that a displacement of the movable member 10 along the Z-axis causes an increase in the radiation received by the phototransistor of one sensor and a corresponding decrease in the radiation received by the phototransistor of the other sensor.

The signals provided in operation of the phototransistors of the sensors 61 and 62 can be combined together in a differential manner to provide an indication of the magnitude and sign of the axial displacements of the movable member 10.

In FIG. 6 is illustrated by way of example a circuit for processing the signals provided by a counterposed pair of position sensors, in particular the pair of sensors 51, 52. Naturally corresponding circuits can be used for processing signals provided by the other pairs of counterposed sensors.

With reference to FIG. 6, the collector of the phototransistor of the sensor 51 is connected to the inverting input of an amplifier 70 the non-inverting input of which is connected to a DC reference voltage source $V_{R1}$.

A resistor R1 is connected between the inverting input and the output of the amplifier 70. By means of a resistor R2 the output of this amplifier is connected to the input of an integrator generally indicated 80 and including an operational amplifier 90 the non-inverting input of which is connected to a DC reference voltage source $V_{R2}$, and a capacitor C connected between the inverting input and the output of this amplifier.

The output of the amplifier 90 is connected to the base of a transistor TR1 which in the embodiment illustrated is of npn type. The collector of this transistor is connected to a reference voltage source $V_R$, and the emitter is connected to the anode of the photodiode of the sensor 51 via a resistor R3.

The above-illustrated circuit arrangement is such that upon variation of the distance between the surface of the body 11 which reflects diffuses radiation emitted from the photodiode towards the phototransistor, the current in the phototransistor is maintained substantially constant.

To this end the circuit correspondingly varies the current supplied to the photodiode of the sensor. The voltage developed across the terminals of the resistor R3 is however proportional to this current, and is therefore indicative of the distance d1 between the sensor 51 and the main body 11 of the movable member 10. The terminals of the resistor R3 are connected to the inputs of an amplifier 100.

To the photodiode and the phototransistor of the sensor 52 is connected a circuit entirely similar to that described above, and the components of which have been indicated with the same alphanumeric references with the single exception of the final amplifier which has been indicated 100'.

The outputs of the amplifiers 100 and 100' are connected to the (+) and (−) inputs of a differential amplifier 110.

In operation tile amplifiers 100 and 100' provide respective output signals indicative of the distances d1 and d2 between the sensors 51, 52 and the main member 11 of the movable member 10. At the output of the differential amplifier 110 there is a definitive signal indicative of the displacement of the movable member with respect to the surrounding support structure along the direction in which the sensors 51 and 52 are aligned.

Upon variation of the distance with respect to the surface which reflects or diffuses the incident radiation, the current flowing in the phototransistor of a sensor of the type described above varies in the manner illustrated in FIG. 6a. As it is shown in this Figure, for distances $d \geq d_o$ the current in the phototransistor varies substantially in inverse proportion to the distance. By indicating the collector current of the phototransistor as $I_c$, and the distance between the sensor and the surface which reflects or diffuses the radiation emitted by the photodiode as d, one has that $I_c = \beta \cdot I_d \cdot 1/d$ in which $\beta$ is a constant, $I_d$ is the current flowing in the photodiode and d is the distance of the sensor from the surface which reflects diffuses the radiation emitted from the photodiode.

From this relation it can be derived that $$I_d = (1/\beta) \cdot I_c \cdot d.$$

The circuits of FIG. 6 are prearranged, as already mentioned, to maintain the current flowing in the phototransistors of the sensors substantially constant upon variation of the distances d1 and d2. The currents flowing in the photodiodes of the sensors 51 and 52 are now directly proportional to the distances d1 and d2 respectively.

Consequently the signal provided at the output of the differential amplifier 110 is substantially proportional to the difference between d1 and d2, which corresponds to the displacement of the axis of the movable member along the direction of alignment of the two sensors in question.

When the ball 19 at the end of the movable member 10 of the feeler device is subjected to a displacement along a direction perpendicular to the Z-axis this movable member does not translate, in reality, in a manner exactly parallel to the Z-axis, but performs a translation movement combined with a rotation. Thus, for example, if with reference to FIG. 7, starting from the rest position, here indicated 0, the end ball 19 of the feeler device is subjected to a displacement x along the X axis, the axis of the movable member of the feeler device displaces from the rest position illustrated in broken outline in FIG. 7 by also performing a slight rotation about the Y axis.

It is important that the centre of this rotation movement be as far as possible from the feeler ball 19. For this purpose it is convenient that the pair of laminar suspension elements B1 and B2 are more yielding, in a radial sense, more than the pair of laminar suspension elements A1 and A2.

This can easily be obtained simply by forming the spiral slots of the laminar elements B1 and B2 with a greater width than that of the spiral slots of the pair of upper suspension elements A1, A2.

Figure 7:
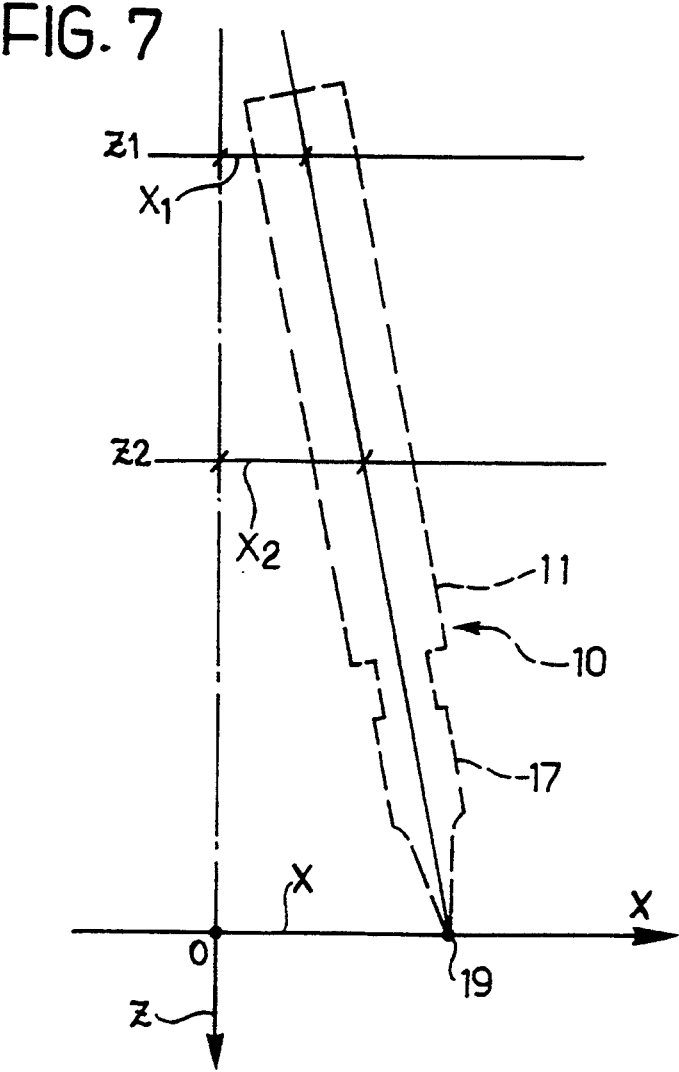
FIG. 7 is a diagram for explaining the manner of calculating the displacement of the feeler member with respect to the support structure along a coordinate axis.

In the case of displacement of the feeler ball 19 along the X-axis, as schematically shown in FIG. 7, the pair of sensors 51, 52 and the pair of sensors 41, 42 and associated circuits, provide respective signals indicative of the displacements $x_1$ and $x_2$ of the axis of the movable member with respect to the rest position (FIG. 7).

Given that the heights z1 and z2 of the two pairs of sensors 51, 52 and 41, 42 with respect to the feeler ball 19 are known, from FIG. 7 one can easily get the following approximate expression for the distance x travelled by the feeler ball 19;

$$x = x_2 \cdot \frac{z_1}{z_1 - z_2} - x_2 \cdot \frac{z_2}{z_1 - z_2}$$

Figure 8:
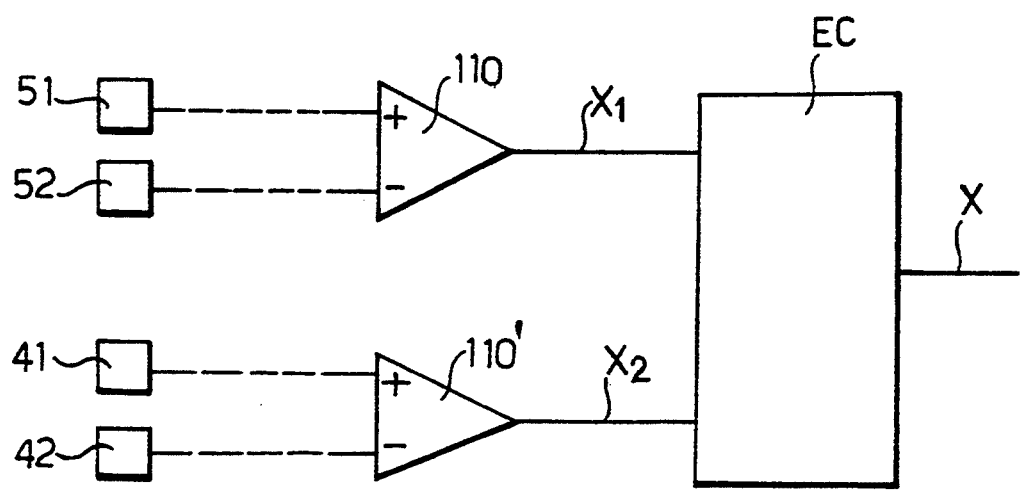
FIG. 8 is a diagram, partially in block diagram form, of the part of the circuit provided for calculating the displacement of the feeler member with respect to a coordinate axis.

In FIG. 8 the differential amplifiers have been indicated 110 and 110′, at which arrive the signals provided by the pairs of sensors 51, 52 and 41, 42 respectively. The output signals from these amplifiers are proportional to $x_1$ and $x_2$.

The outputs of the amplifiers 110 and 110′ are connected to a processing circuit EC which processes the received signals on the basis of the above-indicated relation, and therefore provides at its output a signal indicative of the effective displacement x of the feeler ball 19 along the X-axis.

The signals provided by the other two pairs of sensors aligned along the Y axis can be treated in an entirely similar way to that described above with reference to the pairs of sensors 51, 52 and 41, 42.

With reference to FIG. 2, the signal processing circuits generated by the various position sensors can conveniently be housed on a circuit card here indicated PCB, housed within the interior of the upper part of the support casing of the device. The connection conductors between the sensors and the circuits can conveniently be passed along grooves provided in the inner tubular element 9 of the support casing and in the tubular element 3, as well as in passages, if needed, provided in the interconnection element 4, as shown in FIG. 2.

The feeler device described above has a good operating precision and a relatively simple structure. Overall the device can be made in a simple and economically convenient manner.

Naturally. the principle of the invention remaining the same, the embodiments and details of construction can be widely varied with respect to what has been described and illustrated by way of non-limitative example, without by this departing from the ambit of the present invention.

Thus, for example, it is not necessary to use two pairs of laminar suspension elements for suspension of the movable member to the support structure, but it could generally be sufficient to use an upper suspension element and a lower suspension element.

The laminar elements need not be plain and could, for example, be conical.

Likewise the number, type and arrangement of position sensors can be varied from what has been described above. In particular tile number of sensors intended to detect the displacements of the movable member along the X and Y axes can be reduced. The sensors can moreover be carried by the movable member rather than by the support structure.

The processing of the signals provided by the sensors can be achieved using different circuits from those described above.

Damping of the oscillations call be achieved with other arrangements of a type known per se, for example by means of a viscous fluid (oil or other) confined in the annular interspace comprised between the body 11 and the surrounding casing 3, obviously with the arrangement of annular elastic sealing members between the end portions thereof.

What is claimed is:

1. A feeler device particularly for copying machines comprising
   a support structure,
   an elongate movable member supported by said structure by resilient suspension means operable to allow the movable member to perform limited displacements with respect to this structure along three independent axes with respect to a predetermined rest position; said movable member carrying at one end a feeler element; and
   sensor means operable to provide electrical signals indicative of the magnitude and sign of the displacements along said axes of the movable member with respect to the support structure; said suspension means comprising
   at least first and second laminar members each of which has an aperture; a spiral slot being formed in the region lying between the outer edge and the inner edge of each laminar member, said slot extends around said aperture for an angle greater than 360°;
   said laminar members being interposed between the support structure and the movable member in respective transverse positions spaced along the axes of said member; the peripheral portion and the portion surrounding the aperture of each laminar member being secured one to the support structure and the other to the movable member.

2. A feeler device according to claim 1, wherein said suspension means include first and second pairs of said laminar members spaced along the axis of the movable member; the laminar members of each pair being disposed at a short distance from one another.

3. A feeler device according to claim 2, wherein between the laminar members of each pair are disposed damper means operable to damp oscillations.

4. A feeler device according to claim 3, wherein said damper means include at least one layer of balls immersed in a viscous fluid.

5. A feeler device according to claim 4, wherein on the opposite faces of the laminar elements of each pair is applied a film of material of high viscosity, in particular a grease having a viscosity greater than that of said viscous fluid; said high viscosity material extending into the spiral slots of the laminar members in such a way as to act as a barrier to obstruct impede the escape of the said viscous fluid.

6. A feeler device according to claim 1, wherein said laminar elements are planar.

7. A feeler device according to claim 1, wherein the slots of said laminar elements are substantially conical.

8. A feeler device according to claim 1, wherein the slots of said laminar members have a substantially logarithmic spiral form.

9. A feeler device according to claim 1, wherein the laminar element closest to the feeler member has a spiral slot having a width greater than the width of the slot in the laminar element further from the feeler member.

10. A feeler device according to claim 2, wherein the slots of the laminar elements of each pair are angularly offset from one another in such a way that the resultant radial elastic constant of the pair is substantially constant.

11. A feeler device according to claim 2, wherein the slots of the laminar elements of each pair are angularly offset from one another by 90° or 270°.

12. A feeler device according to claim 1, wherein said sensor means comprise, for each axis, at least first and second sensors each of which includes a radiation emitter and an associated receiver connected to the movable member or to the support structure in such a way that the radiation reflected or diffused from a surface of the support structure or of the movable member varies as a function of the relative position of the movable member with respect to the support structure and a displacement of the movable member with respect to the support structure along this axis causes an increase in the radiation reflected and or diffused towards the receiver of one sensor and a decrease in the radiation reflected and or diffused towards the receiver of the other sensor.

13. A feeler device according to claim 12, wherein for each of the two axes not parallel to the axis of the movable member said sensor means comprise said first and second sensors disposed close to a laminar element or a pair of laminar suspension elements, and a third and fourth sensor close to the other laminar element or other pair of laminar suspension elements.

14. A feeler device according to claim 13, wherein the first and second sensor, as well as the third and fourth sensor are disposed in respective diametrically opposite positions with respect to the axis of the movable member.

15. A feeler device according to claim 12, wherein each sensor includes a light-emitting diode and a phototransistor, and a processing circuit; said processing and control circuit being arranged to supply to the light-emitting diode a current which varies in such a way as to maintain substantially constant the current flowing in the phototransistor.

* * * * *